(12) United States Patent
Sarode et al.

(10) Patent No.: US 12,474,982 B2
(45) Date of Patent: Nov. 18, 2025

(54) FRAMEWORK FOR DIGITAL WORKERS

(71) Applicant: LPL Financial, LLC, Boston, MA (US)

(72) Inventors: Prashant Sarode, Charlotte, NC (US); Swapnil Paranjape, Charlotte, NC (US)

(73) Assignee: LPL FINANCIAL, LLC, Boston, MA (US)

( * ) Notice: Subject to any disclaimer, the term of this patent is extended or adjusted under 35 U.S.C. 154(b) by 459 days.

(21) Appl. No.: 17/663,973

(22) Filed: May 18, 2022

(65) Prior Publication Data
US 2023/0376363 A1    Nov. 23, 2023

(51) Int. Cl.
G06F 9/54     (2006.01)
G06F 9/448    (2018.01)
G06F 9/48     (2006.01)
G06F 11/14    (2006.01)

(52) U.S. Cl.
CPC ............ G06F 9/545 (2013.01); G06F 9/4494 (2018.02); G06F 9/4881 (2013.01); G06F 11/1415 (2013.01)

(58) Field of Classification Search
None
See application file for complete search history.

(56) References Cited

U.S. PATENT DOCUMENTS

| | | | | |
|---|---|---|---|---|
| 2002/0078255 A1* | 6/2002 | Narayan | ............... | H04L 69/329 719/330 |
| 2012/0150844 A1* | 6/2012 | Lindahl | ................. | G06F 16/273 707/769 |
| 2014/0237482 A1* | 8/2014 | Garvey | ................... | G06F 9/505 718/105 |
| 2018/0039521 A1* | 2/2018 | White | ....................... | G06F 9/54 |
| 2018/0357079 A1* | 12/2018 | Demulder | ............... | G06F 9/541 |
| 2020/0076912 A1* | 3/2020 | Cortes | ..................... | G06F 9/544 |

* cited by examiner

Primary Examiner — Lewis A Bullock, Jr.
Assistant Examiner — Jordan Scott Motter
(74) Attorney, Agent, or Firm — Mintz Levin Cohn Ferris Glovsky and Popeo, P.C.

(57) ABSTRACT

In an aspect, task data characterizing a request to perform a task can be received at a first layer within a computing environment and from one of a collection of applications forming a digital worker. A plurality of state machines can be instantiated by the first layer based on the received task data. The instantiated plurality of state machines can be executed by the first layer, and the executing of the instantiated plurality of state machines can include the performing, by the plurality of state machines, of application programming interface calls to a remote computing environment. The application programming interface calls can cause the remote computing environment to perform an operation for the digital worker, based on the received task data, such that the task is performed.

20 Claims, 9 Drawing Sheets

FRAMEWORK FOR DIGITAL WORKERS

FIELD

The current subject matter relates to methods and systems for an improved framework for digital workers.

BACKGROUND

Some existing digital worker platforms require multiple complex software layers between a cloud provider and the digital workers to provide digital worker support functionality (e.g., natural language processing, AI/ML, etc.). These complex systems can require a substantial amount of computational resources to operate, and as such can result in excessive operational costs for the digital worker platform. And, as they can often be operated by multiple vendors, these systems can be vulnerable to multiple points of failure that can result in downtime and/or service outages.

SUMMARY

Methods and systems for an improved framework for digital workers are provided. Related apparatus, techniques, and articles are also described.

In an aspect, task data characterizing a request to perform a task can be received at a first layer within a computing environment and from one of a collection of applications forming a digital worker. A plurality of state machines can be instantiated by the first layer based on the received task data. The instantiated plurality of state machines can be executed by the first layer, and the executing of the instantiated plurality of state machines can include the performing, by the plurality of state machines, of application programming interface calls to a remote computing environment. The application programming interface calls can cause the remote computing environment to perform an operation for the digital worker, based on the received task data, such that the task is performed.

One or more of the following features can be included in any feasible combination. For example, the first layer can be an integration interface residing between a digital worker application layer and the remote computing environment, and the collection of applications can reside in the digital worker application layer. For example, the one of the collection of applications can be configured to execute an end-to-end process that includes the task. For example, the instantiating of the plurality of state machines can include instantiating a first state machine of the plurality of state machines that can be configured to determine, from the received task data, subtask data characterizing instructions for performing at least a portion of the task, and the instantiating of the plurality of state machines can include instantiating a second state machine of the plurality of state machines that can be configured to determine resource data characterizing a computational resource of the remote computing environment required to perform the subtask. For example, output data characterizing a result of the performed task can be received by the first layer and via the application programming interface, and the output data can be provided to the one of the collection of applications. For example, the output data can be provided by the one of the collection of applications to a graphical user interface for depiction therein. For example, the second state machine can monitor for an event characterizing an operation performed by the first state machine, and, in response to detection of the event, the second state machine can perform a state transition. For example, the task can include at least one of optical character recognition, automated machine learning, Rivest-Shamir-Adleman ("RSA") encryption, business process management, data storage, human-in-the-loop ("HIL") simulation, scheduling, monitoring, alerting, and security and password vault processes. For example, the remote computing environment can include a feature layer configured to perform the task and an infrastructure as a service layer that can be configured to provide a computational resource for performing the task. For example, the task data can be received from a digital worker state machine that forms the digital worker.

In another aspect, a system is provided and can include at least one data processor and memory storing instructions configured to cause the at least one data processor to perform operations described herein. The operations can include receiving, at a first layer within a computing environment, task data characterizing a request to perform a task, the task data received from one of a collection of applications forming a digital worker; instantiating, by the first layer, a plurality of state machines based on the received task data; and executing, by the first layer, the instantiated plurality of state machines, the executing including the performing, by the plurality of state machines, of application programming interface calls to a remote computing environment, the application programming interface calls causing the remote computing environment to perform an operation for the digital worker, based on the received task data, such that the task is performed.

One or more of the following features can be included in any feasible combination. For example, the first layer can be an integration interface residing between a digital worker application layer and the remote computing environment, and the collection of applications can reside in the digital worker application layer. For example, the one of the collection of applications can be configured to execute an end-to-end process that includes the task. For example, the instantiating of the plurality of state machines can include instantiating a first state machine of the plurality of state machines that can be configured to determine, from the received task data, subtask data characterizing instructions for performing at least a portion of the task, and the instantiating of the plurality of state machines can include instantiating a second state machine of the plurality of state machines that can be configured to determine resource data characterizing a computational resource of the remote computing environment required to perform the subtask. For example, the second state machine can monitor for an event characterizing an operation performed by the first state machine, and, in response to detection of the event, the second state machine can perform a state transition. For example, the operations can further include receiving, by the first layer and via the application programming interface, output data characterizing the performed task; and providing the output data to the one of the collection of applications. For example, the operations can further include providing, by the one of the collection of applications, the output data to a graphical user interface for depiction therein. For example, the task can include at least one of optical character recognition, automated machine learning, Rivest-Shamir-Adleman ("RSA") encryption, business process management, data storage, human-in-the-loop ("HIL") simulation, scheduling, monitoring, alerting, and security and password vault processes. For example, the remote computing environment can include a feature layer configured to perform the task and an infrastructure as a service layer that can be configured to provide a computational resource for performing the task.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
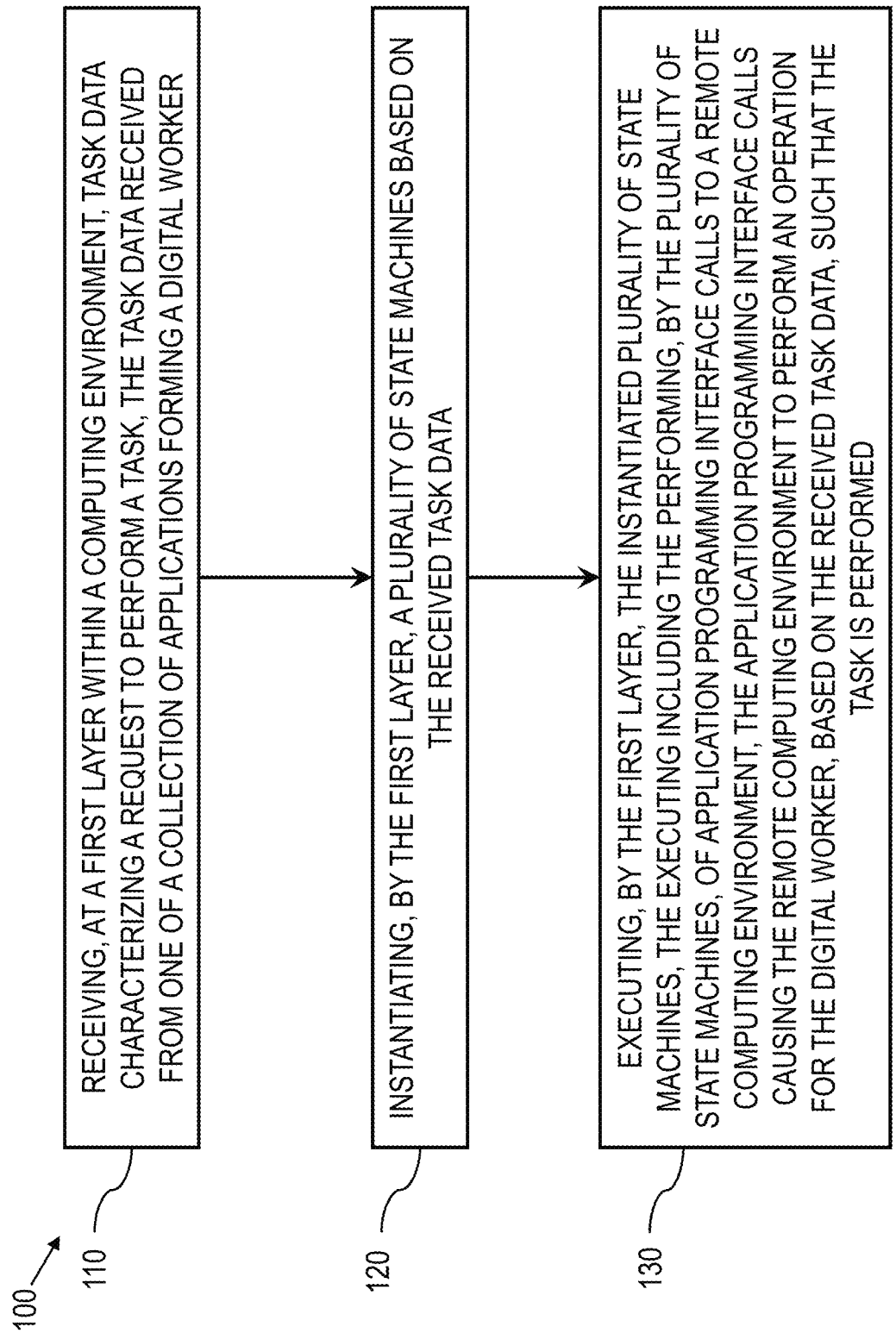
FIG. 1 is a process flow diagram illustrating an example process of some implementations of the current subject matter that can provide for an improved framework for digital workers.

Digital workers can include a class of enterprise applications for performing tasks and can follow an agent-based construct that can simulate actions and interactions of autonomous agents, for example, sometimes referred to as "bots." Some existing frameworks for the creation and operation of digital workers can require multiple complex software layers between a cloud provider and the digital workers to provide digital worker support functionality (e.g., natural language processing, AI/ML, and the like). These complex systems can require a substantial amount of computational resources to operate, can require significant maintenance by highly skilled developers, which can be costly, and can act as a single point of failure such that if one complex system has an outage of service, the entire digital worker can fail. And further, it can be costly to increase capacity to host digital works as demand increases.

In general, methods and systems for an improved framework for digital workers are provided. In some implementations, the improved framework can provide an improved runtime environment by choreographing features of cloud providers to support digital worker creation and operation. The cloud provider features can be choreographed in a manner that enables the building and operation of digital workers in a manner that is scalable, fault tolerant, and allows for a wide variety of capabilities to be included in the created digital workers. The improved framework can provide for the performance of digital worker tasks by use of a single integration layer residing between the cloud provider features and the digital workers. In some implementations, the single integration layer can create the construct of a digital worker by choreographing a set of digital worker applications (which comprise the digital worker) and that utilize the features of the cloud providers. In some implementations, the orchestration can be performed by one or more state machines configured to connect the digital worker applications to cloud services via a messaging standard (e.g., messaging services).

In some implementations, the improved framework can include a serverless architecture. In some implementations, a platform can be provided that enables a user to build digital workers and turn cloud providers into hosting environments for the digital workers. The platform can enable white-labeling of digital workers, including enabling domain specific knowledge and intelligence capabilities, as well as subscription and billing system, management and tracking of work sent to digital workers, and training and certification program for building complex digital operational solutions. In some implementations, the platform can be implemented in a wealth management system, for example, to build and host digital workers directed towards providing wealth management advice (e.g., robo-advisors).

Advantageously, in some implementations, the system and methods herein can enable the creation and operation of digital workers in a single integration layer. As a result, operational costs can be reduced and the need for complex specialized network equipment or network deployments can also be reduced.

FIG. 1 is a process flow diagram illustrating an example process 100 of some implementations of the current subject matter that can provide for improved framework for digital workers. The improved framework can include a single integration layer that can choreograph digital worker tasks and cloud provider features. By utilizing a single integration layer, increased control and optimization of the operations of the digital worker platform can be realized. In addition, some implementations of the subject matter described herein can provide for scalability of cloud computational resources that is closely tied to the demand for those resources, thereby resulting in the more efficient use of the cloud computational resources.

At 110, task data characterizing a request to perform a task can be received at a first layer within a computing environment from one of a collection of applications forming a digital worker. In some implementations, each of the collection of applications can form one or more state machines. In some implementations, each of the collection of applications can be configured to execute an end-to-end process that includes the task, and one or more of the collection of applications can reside in the digital worker application layer. The first layer can be an integration interface residing between a digital worker application layer and the remote computing environment. The digital worker application layer can be an abstraction layer configured to specify communications protocols and interaction and/or interface methods with a user that has requested the performance of the task. The digital worker application layer can, based on the user's interaction with the digital worker application layer to request the performance of the task, generate the task data and provide the task data to the one of the collection of applications described above.

In some implementations, the remote computing environment can include a cloud computing environment such as Amazon Web Services (AWS), Microsoft Azure, and the like. The remote computing environment can be a computing environment that is not local to the first layer and/or the digital worker application layer. For example, the remote computing environment can be externally operated and maintained relative to the first layer and/or the digital worker application layer. In some implementations, the remote computing environment can be accessed by the first layer by the performance of one or more application programming interface ("API") calls, as discussed further below. In some implementations, the remote computing environment can include a feature layer that is configured to perform the task and an infrastructure-as-a-service (IaaS) layer that is configured to provide computational resources, storage resources, and networking resources required for the performing of the task on an on-demand basis.

As explained above, in some implementations, the first layer can be an integration interface configured to facilitate the transformation, routing, and protocol conversion required to transport the task data to the remote computing environment via the one or more API calls. For example, the first layer can provide one or more location-independent mechanisms for integration between the digital worker application layer and the remote computing environment, and the first layer can provide dynamic service substitution and/or virtualization based on computational requirements needed for performance of the task. The first layer can also be configured to regulate messaging and interaction protocols between the digital worker application layer and the remote computing environment.

In some implementations, the first layer can provide one or more capabilities to facilitate the performance of a requested task. For example, the first layer can serve as a mechanism that enables the task characterized by the task data to be reliably performed by one of many available computational resources of the remote computing environment. In addition, the first layer can permit the integration of disparate components of the collection of applications forming the digital worker into new solutions with adequate resourcing provided by the remote computing environment. In some implementations, the first layer can permit the integration of one or more state machines forming the digital worker, which can internally make API calls and/or send messages to one or more dependent applications, into new solutions with the resources provided by the remote computing environment. In addition, the first layer can provide the ability to discover one or more of the computational resources of the remote computing environment and, at runtime, to support the virtualization of services so that changes to the end-points (i.e., the locations from where the services are called and where the services are provided) can occur without impact to the collection of applications forming the digital worker and the remote computing environment. In an additional example, the first layer can, by performing the above-described message transformation, connect the one of the collection of applications requesting the performance of the task to the remote computing environment, and the first layer can publish and subscribe messages and events asynchronously. In addition, the first layer can include a set of capabilities that are configured to facilitate the handling of exceptions and thereby maintain reliability of task performance. In addition, the first layer can include a set of capabilities for facilitating the enforcement of access privileges and other security policies. In addition, the first layer can include a set of capabilities for maintaining a history of task performance requests and for tracking the status of the task performance requests.

As explained above, in some implementations, the task can include one or more operations to be performed by the remote computing environment, and the task can be based on the user's interaction with the digital worker application layer in specifying the requirements of the task. For example, the operations to be formed can include one or more of the following operations: optical character recognition, automated machine learning, Rivest-Shamir-Adleman ("RSA") encryption, business process management, data storage, human-in-the-loop ("HIL") simulation, scheduling, monitoring, and alerting, security and password vault processes, and coding toolkit (e.g., open document format (ODF))+integrated design environment (IDE)). In some implementations, when one or more state machines forms the digital worker, the one or more state machines can call the one or more operations to execute the performance of the task.

At 120, a plurality of state machines can be instantiated based on the received task data. Each of the plurality of state machines can be a programming architecture that is configured with decision-making logic for determining when a process, such as that used for the performance of the above-described task, should move from one state of the process to another state of the process. The first layer can instantiate the plurality of state machines.

In some implementations, the plurality of state machines can include a first state machine. The first state machine can be configured to determine, from the received task data, subtask data characterizing instructions for performing at least a portion of the task. In some implementations, the plurality of state machines can include a second state machine. The second state machine can be configured to determine resource data that characterizes a computational resource of the remote computing environment that is required to perform the subtask determined by the first state machine. In some implementations, as described in further detail below, the second state machine can monitor for an event that characterizes an operation performed by the first state machine, and the second state machine can perform a state transition in response to the detection of the event. Exemplary events can include one or more of a determination of a request as being IGO/NIGO based on available request/task data and process rules inside the first state machine, an enrichment of a task request with additional data-lookup from one or more remote systems so that the task can be performed, a performance of subjective and cognitive research on pre-determined and/or dynamically-inferred research sources (e.g., records systems, external rating agencies, opinion/news feeds, etc.), an input on HIL capabilities of the digital worker, an update to a records system, a communication with human stakeholders, a generation of events for triggering other state machines and/or digital workers that are downstream and/or side-stream of the first and/or second state machines, and the like. Additional state machines can be instantiated, as necessary, to complete the task. By utilizing state machines to choreograph between digital workers and cloud provider features, complex functionality can be provided using an architecture that is simplified, scalable, and fault tolerant as compared to some existing approaches.

At 130, the instantiated plurality of state machines can be executed. The execution of the plurality of state machines can include the performance, by the plurality of state machines, of API calls to the remote computing environment. The API calls can cause the remote computing environment to perform an operation for the digital worker, based on the received task data, such that the task is performed.

In some implementations, the first layer can receive, via the API, a response that includes output data characterizing a result of the performed task. In some implementations, the output data can be provided to the one of the collection of applications using one or more protocols, such as SFTP, SMTP, REST, MQ, JMS (Java Messaging Service), streaming events via Kafka, Kinesis or via Cloudwatch alerts, or via Surface Automation on HTTP/HTTPS pages. In some implementations, the one of the collection of applications can provide the output data to a graphical user interface for depiction thereon. In some implementations, the first layer can determine a response to the queries from the digital worker application layer based on the output data.

Figure 2A:
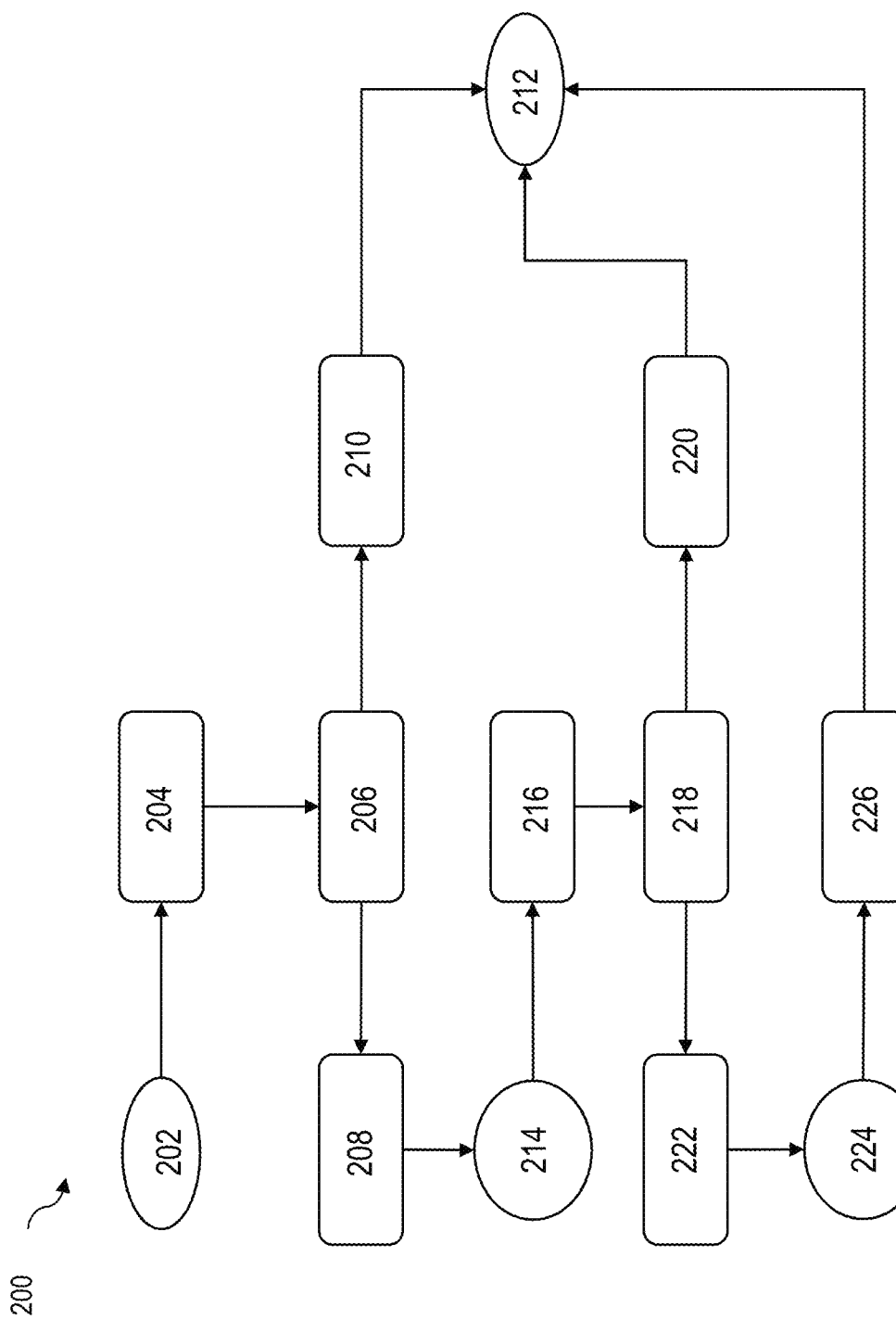
FIG. 2A is a process flow diagram illustrating an exemplary state machine that, consistent with some implementations of the current subject matter, can be configured for acquisition, division, and routing of tasks.

FIG. 2A is a process flow diagram 200 illustrating an exemplary state machine of the plurality of state machines (e.g., the first state machine described above) that, in some implementations of the current subject matter, can be configured for acquisition, division, and routing of tasks. After execution of the state machine is triggered at 202, the state machine transitions to a state 204 in which the process for acquiring the task data is initialized. Upon the transition to state 204, the state machine transitions to a state 206 in which the state machine acquires the task data. If the state machine successfully acquires the task data, the state machine transitions to a state 208 in which the state machine has successfully acquired the task data and is awaiting the occurrence of an event 214, such as an instruction to divide the task. If the state machine is unable to successfully acquire the task data, the state machine transitions to a state 210 in which the state machine has failed to acquire the task data, and then the execution of the state machine is terminated at 212. If the event 214 occurs, the state machine transitions to a state 216 in which the process for dividing the task characterized by the task data into one or more subtasks is initialized. Upon the transition to state 216, the state machine transitions to a state 218 in which the state machine divides the task into the one or more subtasks. In some implementations, at state 218, the state machine can, in dividing the task into the one or more subtasks, call one or more APIs to one or more remote systems (e.g., a document repository, etc.) to obtain a list of the subtasks (e.g., a document characterizing the one or more subtasks, etc.). If the state machine is unable to divide the task into the one or more subtasks, the state machine transitions to a state 220 in which the state machine has failed to divide the task, and then the execution of the state machine is terminated at 212. If the state machine has successfully divided the task, the state machine transitions to a state 222 in which the state machine has successfully divided the task into one or more subtasks and is awaiting the occurrence of an event 224. If the event 224 occurs, the state machine transitions to a state 226 in which it routes subtask data characterizing the one or more subtasks for further processing. In some implementations, the subtask data can be routed based on one or more characteristics associated with the one or more subtasks (e.g., a type of document characterizing the one or more subtasks, etc.). The execution of the state machine is then terminated at 212.

Figure 2B:
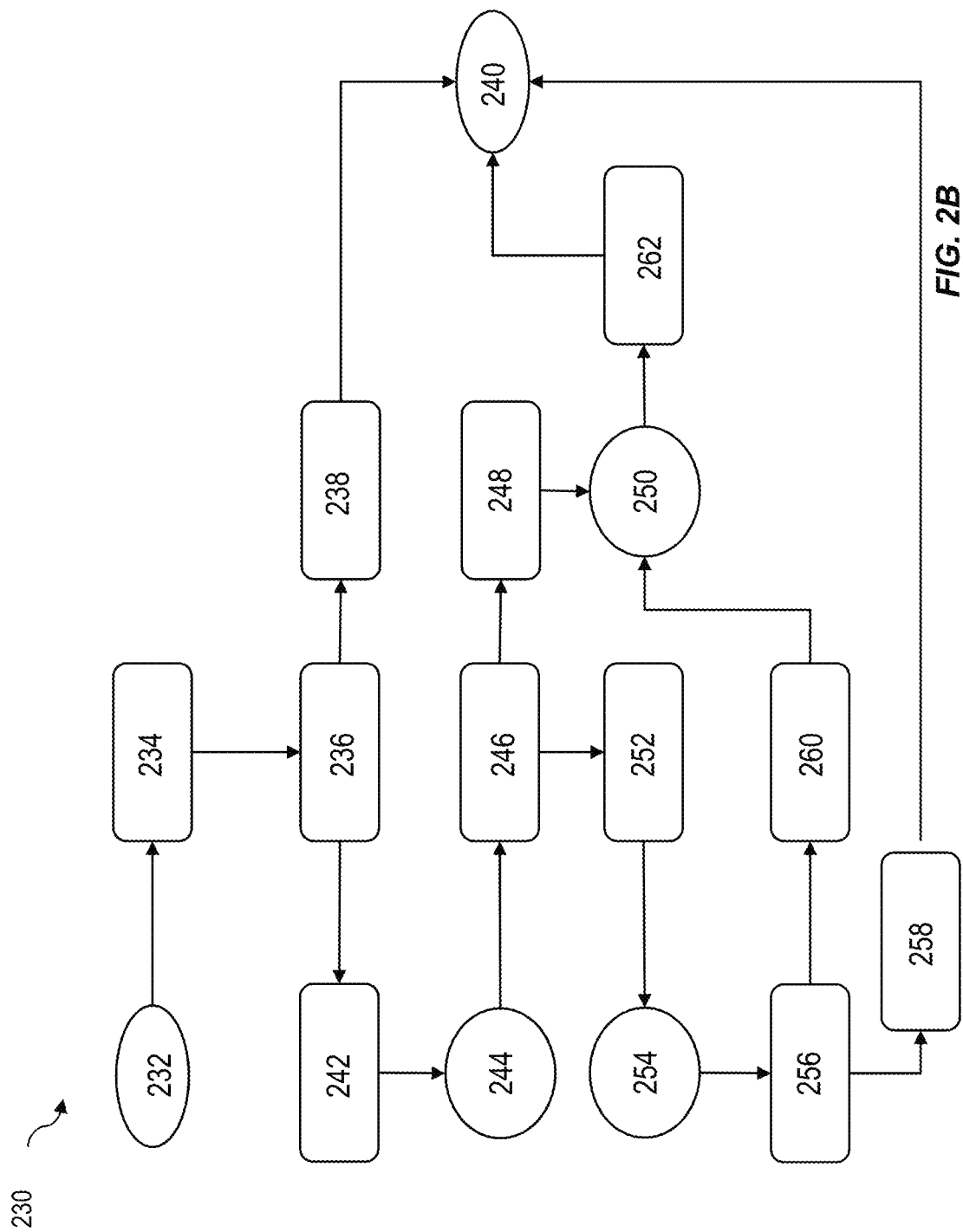
FIG. 2B is a process flow diagram illustrating an exemplary state machine that, consistent with some implementations of the current subject matter, can be configured for data extraction, data validation, and the resourcing of computational resources for use in performing tasks.

FIG. 2B is a process flow diagram 230 illustrating an exemplary state machine of the plurality of state machines (e.g., the second state machine described above) that, consistent with some implementations of the current subject matter, can be configured for data extraction, data validation, and the resourcing of computational resources for use in performing the task characterized by the task data. After execution of the state machine is triggered at 232, the state machine transitions to a state 234 in which the process for extracting data characterizing the one or more subtasks from the subtask data is initialized. Upon the transition to state 234, the state machine transitions to a state 236 in which the state machine extracts the data from the subtask data. If the state machine is unable to successfully extract the data, the state machine transitions to a state 238 in which the state machine has failed to extract the data, and then the execution of the state machine is terminated at 240. If the state machine successfully extracts the data, the state machine transitions to a state 242 in which the state machine has successfully extracted the data characterizing the one or more subtasks and is awaiting the occurrence of an event 244. If the event 244 occurs, the state machine transitions to a state 246 in which the process for validating the extracted data is initialized. If the extracted data is not successfully validated, the state machine transitions to a state 248 in which the validation of the extracted data has failed and in which the state machine is awaiting the occurrence of an event 250. If the extracted data is successfully validated, the state machine transitions to a state 252 in which the validation of the extracted data was successful and in which the state machine is awaiting the occurrence of an event 254. If the event 254 occurs, the state machine transitions to a state 256 in which a first level human review occurs. If the first level human review is successful, the state machine transitions to a state 258 in which the first human level review was deemed successful, and the execution of the state machine then terminates at 240. If the first level human review is not successful, the state machine transitions to a state 260 in which the first level human review is deemed a failure and awaits the occurrence of the event 250. If the event 250 occurs, the state machine transitions to a state 250 in which a second level human review occurs, and the execution of the state machine then terminates at 240.

Figure 2C:
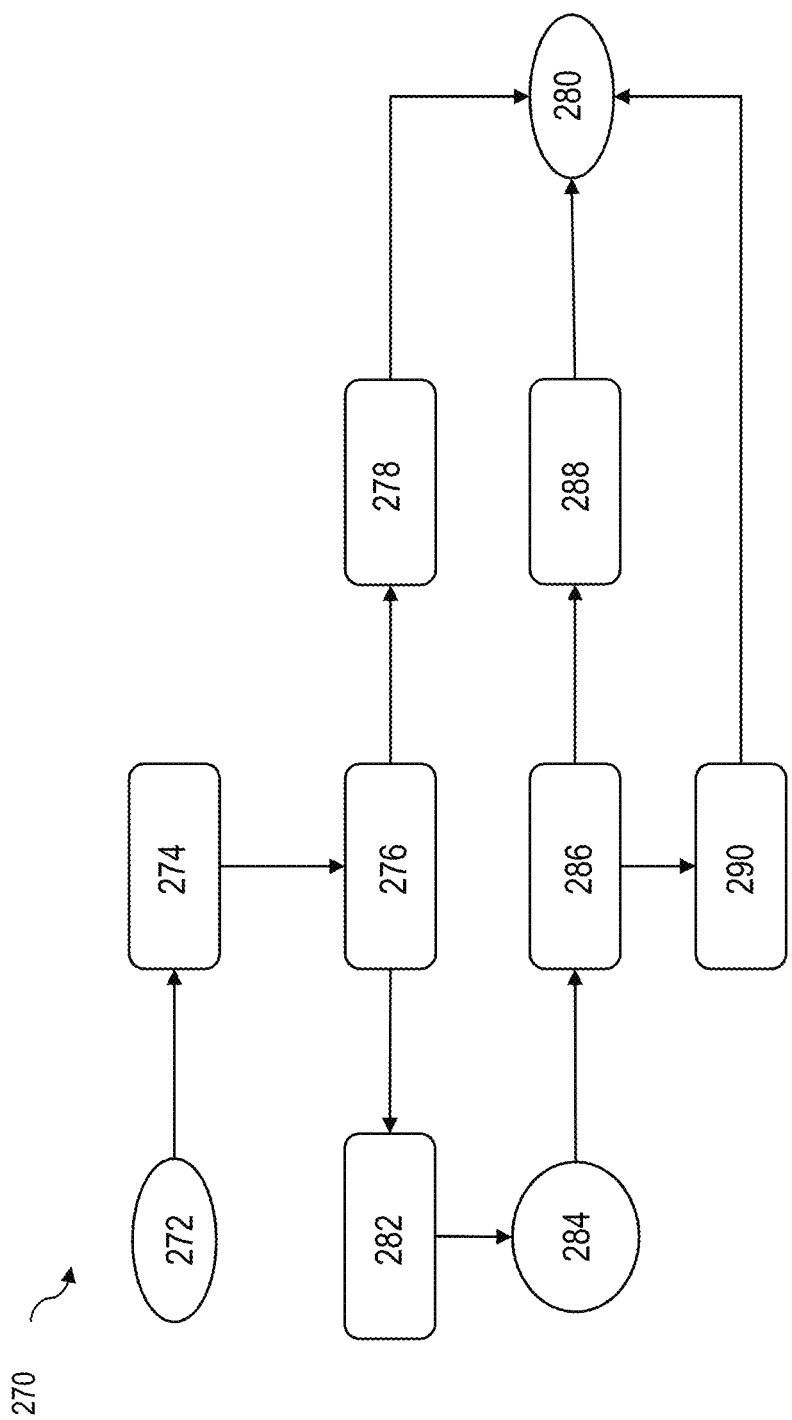
FIG. 2C is a process flow diagram illustrating an exemplary state machine that, consistent with some implementations of the current subject matter, can be configured to manage the performance of a task.

FIG. 2C is a process flow diagram 270 illustrating an exemplary state machine of the plurality of state machines that, in some implementations of the current subject matter, can be configured to manage the performance of a task. After execution of the state machine is triggered at 272, the state machine transitions to a state 274 in which the process for performing a work status update is initialized. Upon the transition to state 274, the state machine transitions to a state 276 in which the work status update is performed. If the state machine is unable to successfully perform the work status update, the state machine transitions to a state 278 in which the state machine has failed to perform the work status update, and then the execution of the state machine is terminated at 280. If the state machine is able to successfully perform the work status update, the state machine transitions to a state 282 in which the state machine has successfully performed the work status update and is awaiting the occurrence of an event 284. If the event 284 occurs, the state machine transitions to a state 286 in which a process for making a status notification is initiated. If the status notification process is successful, the state machine transitions to a state 288 in which the status notification process is successful, and the execution of the state machine is terminated at 280. If the status notification is unsuccessful, the state machine transitions to a state 290 in which the status notification process has failed, and the execution of the state machine is terminated at 280.

Figure 3:
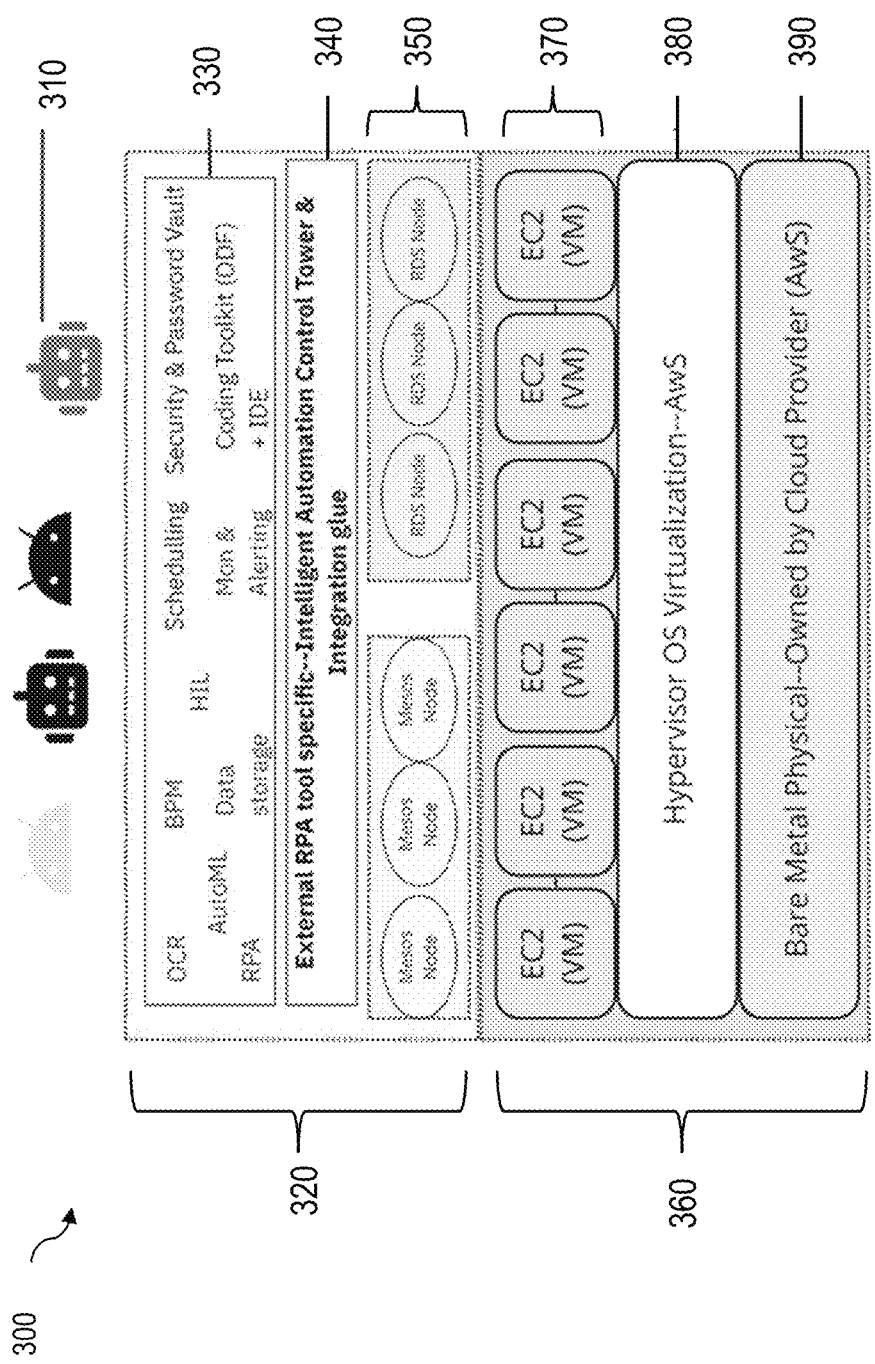
FIG. 3 is a system diagram illustrating an exemplary runtime environment consistent with some implementations of the current subject matter that feature multiple integration layers.

FIG. 3 is a system diagram 300 illustrating an exemplary current runtime environment requiring multiple layers to support digital worker applications. As shown, in some implementations, the runtime environment can include one or more digital workers that are configured to operate in a digital worker application layer 310 such as the digital worker application layers described elsewhere herein. The one or more digital workers residing in the digital worker application layer 310 can operate with one or more second party layers 320 that are owned by a second party that is independent from a first party operating the digital worker application layer 310. In some implementations, the second party layer 320 can include an application feature layer 330 that is configured to host the collection of applications described above. The second party layer 320 can also include an external, RPA tool-specific, intelligent automation control tower and integration glue layer 340 that is configured to integrate the application feature layer 330 with one or more remote computing environment computational resources to execute tasks. The second party layer 320 can also include a node layer 350, and the node layer 350 can include mesos nodes, RDS nodes, and/or the like that are configured to provide a link between the application feature layer 330 and an infrastructure-as-a-service layer 360 that is operated by a third party as a remote computing environment (e.g., a cloud environment). As shown, the infrastructure-as-a-service layer 360 can include one or more EC2 virtual machines 370, a Hypervisor OS virtualization 380, and a bare metal physical processor 390. The one or more EC2 virtual machines 370 can be configured to operate on the Hypervisor OS virtualization 380. The Hypervisor OS virtualization 380 can be configured to virtualize an operating system and to operate on the bare metal physical processor 390, which includes at least one data processor for performing one or more aspects of the functionality described above.

Figure 4A:
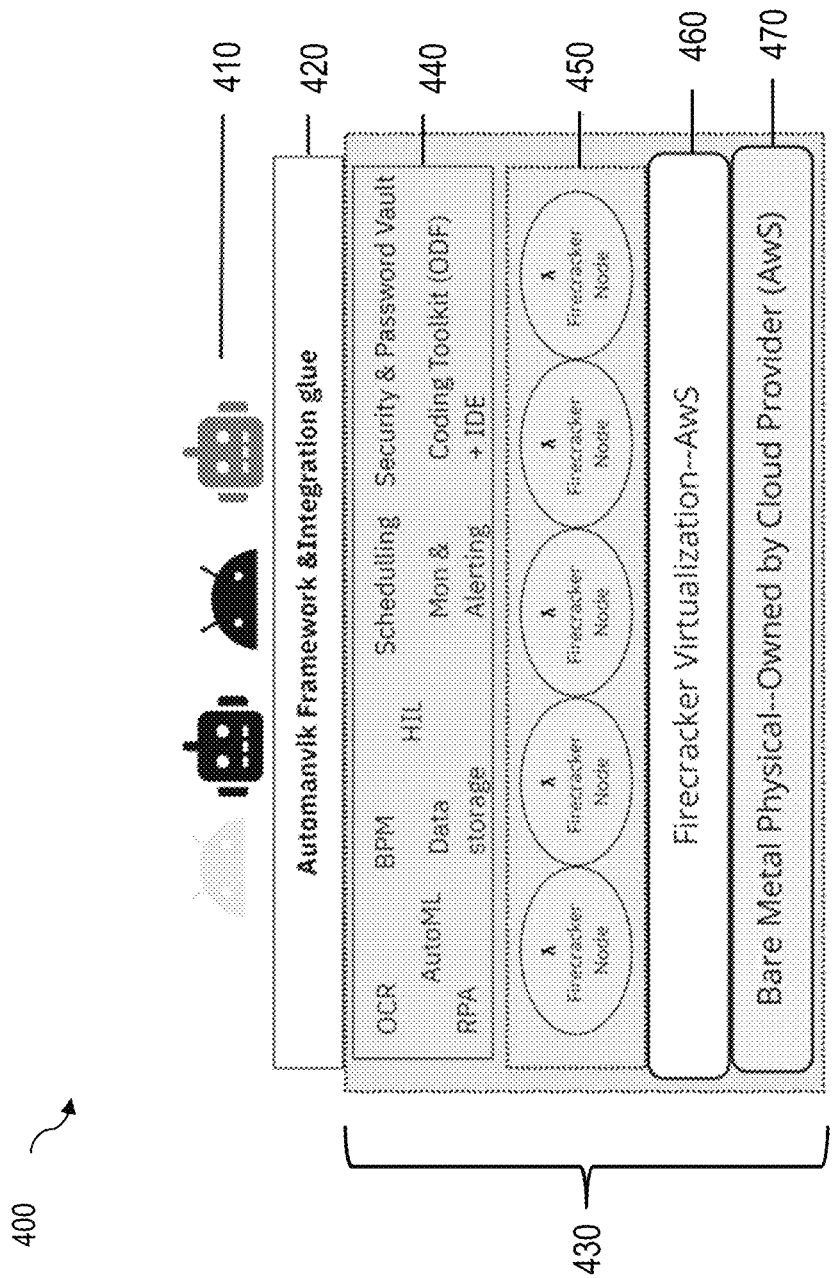
FIG. 4A is a system diagram illustrating an additional exemplary runtime environment consistent with some implementations of the current subject matter that feature a single integration layer.

FIG. 4A is a system diagram 400 illustrating an exemplary runtime environment consistent with some implementations of the current subject matter featuring a single integration layer. Although the runtime environment described here is described as featuring single integration layer, in some implementations, the runtime environment can feature multiple integration layers. As shown, the runtime environment can include one or more digital workers that are configured to operate in a digital worker application layer 410 such as the digital worker application layers described elsewhere herein. The one or more digital workers residing in the digital worker application layer 410 can operate with a Framework & Integration glue layer 420, which is a single integration layer configured to integrate the digital worker application layer 410 with one or more remote computing environment computational resources to execute tasks. As such, the layer 420 can interface with an infrastructure-as-a-service layer 430 operated by a third party service provider, separate from the operator of the digital worker application layer 410, as a remote computing environment (e.g., cloud environment). As shown, the infrastructure-as-a-service layer 430 can include an application feature layer 440 that is configured to host the collection of applications described above. The infrastructure-as-a-service layer 430 can also include a node layer 450, and the node layer 450 can include one or more nodes (e.g., firecracker nodes) that are configured to provide a link between the application feature layer 440 and a virtualization 460 configured to virtualize an operating system for use in performing tasks. The virtualization 460 can be configured to operate on a bare metal physical processor 470 of the infrastructure-as-a-service layer 430, which includes at least one data processor for performing one or more aspects of the functionality described above.

Figure 4B:
FIG. 4B is a system diagram that illustrates exemplary aspects of the single integration layer of FIG. 4A.

FIG. 4B is a system diagram illustrating exemplary components of the Framework & Integration glue layer 420. As shown, the layer 420 can include a design pattern 481, which can characterize diagrams and implementation standards. The layer 420 can also include DevOps+MLOps code 482, standardized state machines for digital worker application code and schema designs 483, customer connector code 484, event messaging standard and routing rule code and JavaScript Object Notation (JSON) schemas 485, human in loop user experience (UX) templates and integrations code 486, alerting monitoring, and logging utilities code 487, training content and recordings 488, training data sets, ML-trained model code, and natural language processing (NLP) lexicon engine code 489, and digital worker application code/cloud-hosted SaaS services 490 for such exemplary implementations as automated wealth management (e.g., robo-advisors, and the like).

Figure 5:
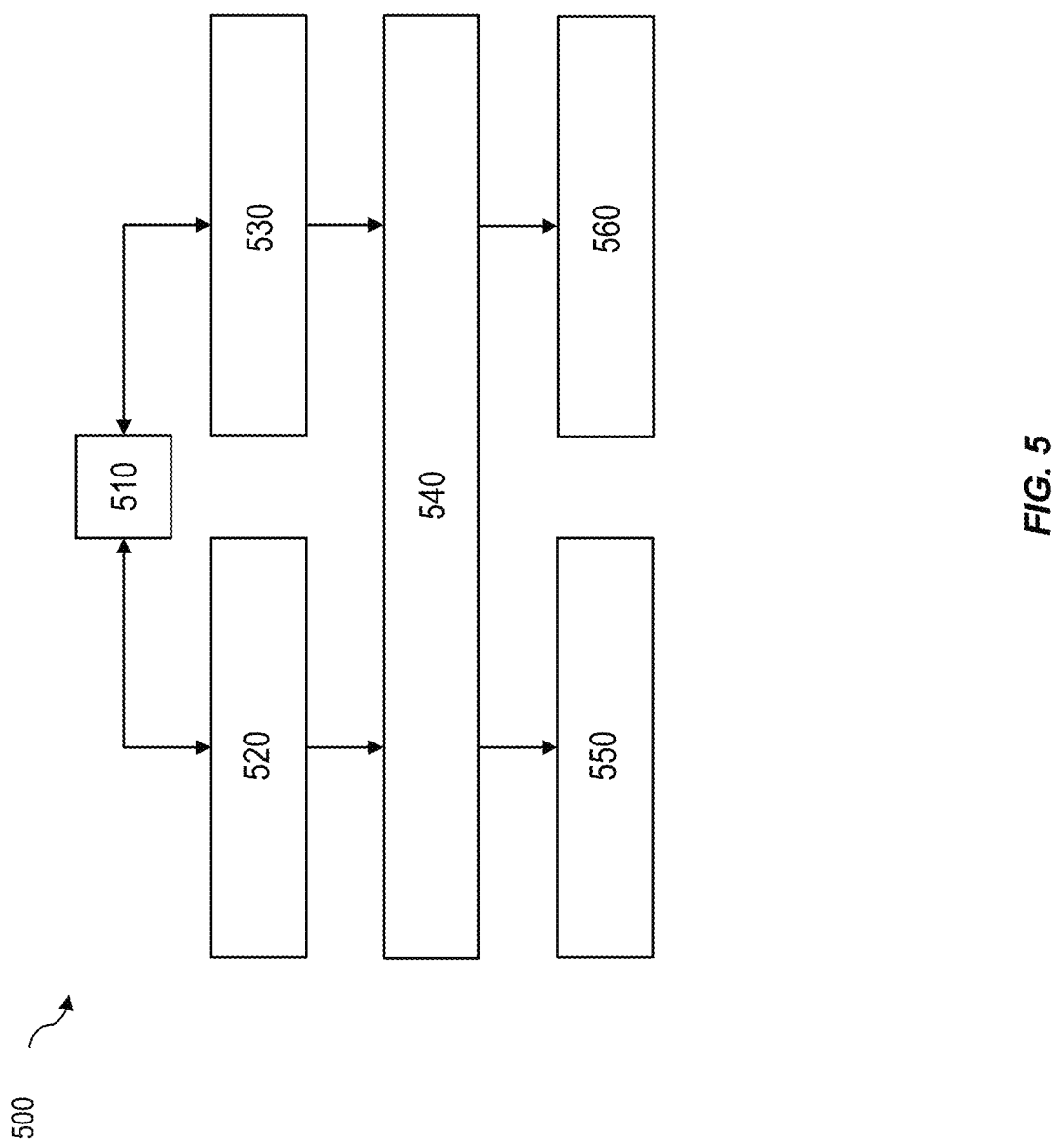
FIG. 5 is a system diagram illustrating an exemplary implementation of one or more digital worker applications that can utilize some implementations of the current subject matter.

FIG. 5 is a system diagram 500 illustrating an exemplary implementation of one or more digital worker applications that can utilize some implementations of the current subject matter. As shown, a user 510 can interact with a user targeting and engagement digital worker 520 and/or an onboarding digital worker 530 and thereby provide the user targeting and engagement digital worker 520 and/or the onboarding digital worker 530 with user data that characterizes the user. The user targeting and engagement digital worker 520 and/or the onboarding digital worker 530 can provide the acquired user data to one or more digital worker applications 540 that can determine tasks to be performed based on the acquired user data and by using the functionality described above. The output of the performed tasks can be provided to a first model 550, and the first model 550 can make one or more determinations about the user based on the output. Example models include one or more portfolio allocation models configured to match a risk profile of an investor with an investment goal of the investor, such as an environmental social, and governance (ESG) model, a Retirement Income that Lasts model, a Growth model, and a Fixed Income model. In addition, the output of the performed tasks can be provided to a second model 560, and the second model 560 can make one more recommendations on future courses of action for the user based on the output.

Figure 6:
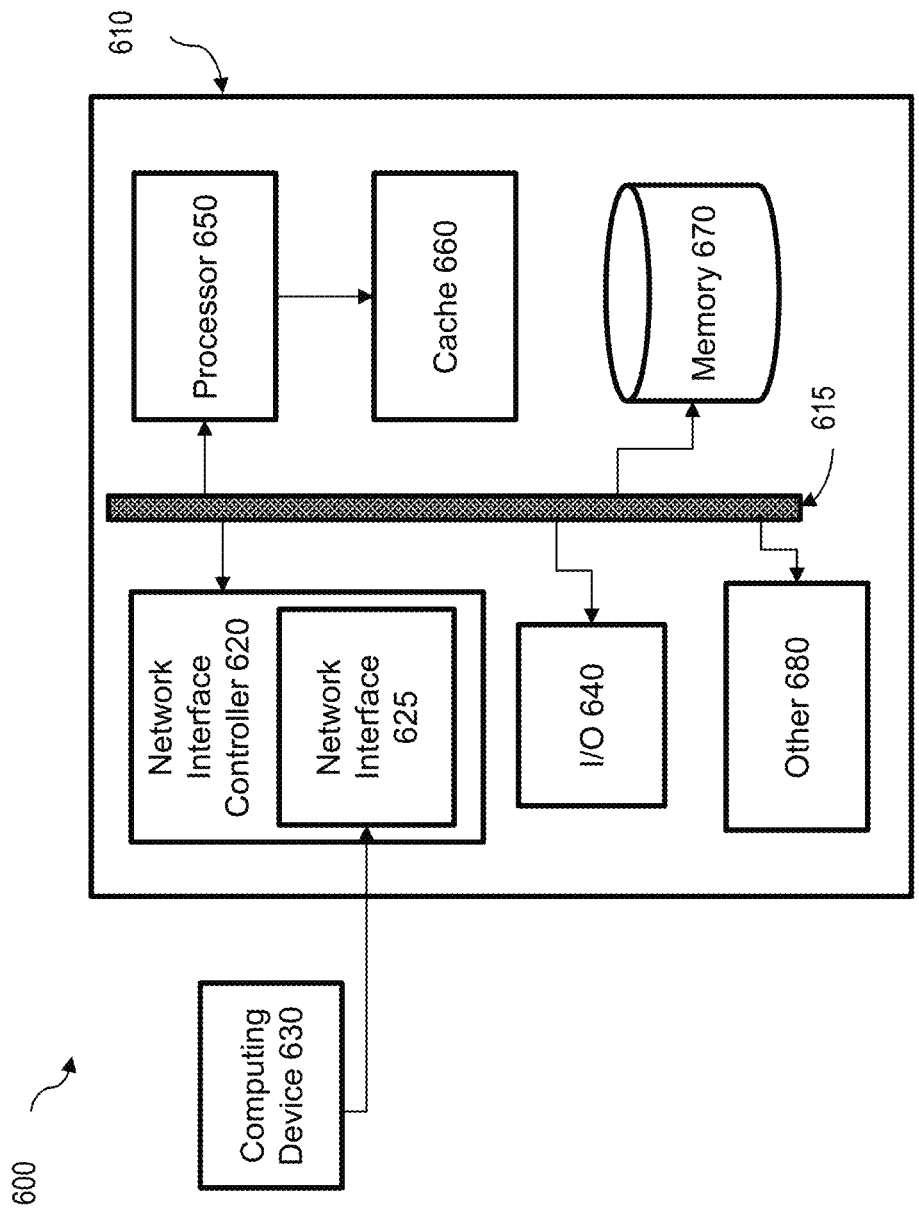
FIG. 6 is a block diagram of an exemplary computing system in accordance with an illustrative implementation of the current subject matter.

FIG. 6 is a block diagram 600 of a computing system 610 suitable for use in implementing the computerized components described herein. In broad overview, the computing system 610 includes at least one processor 650 for performing actions in accordance with instructions, and one or more memory devices 660 and/or 670 for storing instructions and data. The illustrated example computing system 610 includes one or more processors 650 in communication, via a bus 615, with memory 670 and with at least one network interface controller 620 with a network interface 525 for connecting to external devices 630, e.g., a computing device. The one or more processors 650 are also in communication, via the bus 615, with each other and with any I/O devices at one or more I/O interfaces 640, and any other devices 680. The processor 650 illustrated incorporates, or is directly connected to, cache memory 660. Generally, a processor will execute instructions received from memory. In some embodiments, the computing system 610 can be configured within a cloud computing environment, a virtual or containerized computing environment, and/or a web-based microservices environment.

In more detail, the processor 650 can be any logic circuitry that processes instructions, e.g., instructions fetched from the memory 670 or cache 660. In many embodiments, the processor 650 is an embedded processor, a microprocessor unit or special purpose processor. The computing system 610 can be based on any processor, e.g., suitable digital signal processor (DSP), or set of processors, capable of operating as described herein. In some embodiments, the processor 650 can be a single core or multi-core processor. In some embodiments, the processor 650 can be composed of multiple processors.

The memory 670 can be any device suitable for storing computer readable data. The memory 670 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 610 can have any number of memory devices 670.

The cache memory 660 is generally a form of high-speed computer memory placed in close proximity to the processor 650 for fast read/write times. In some implementations, the cache memory 660 is part of, or on the same chip as, the processor 650.

The network interface controller 620 manages data exchanges via the network interface 625. The network interface controller 620 handles the physical, media access control, and data link layers of the Open Systems Interconnect (OSI) model for network communication. In some implementations, some of the network interface controller's tasks are handled by the processor 650. In some implementations, the network interface controller 620 is part of the processor 650. In some implementations, a computing device 610 has multiple network interface controllers 620. In some implementations, the network interface 625 is a connection point for a physical network link, e.g., an RJ 45 connector. In some implementations, the network interface controller 620 supports wireless network connections and an interface port 625 is a wireless Bluetooth transceiver. Generally, a computing device 610 exchanges data with other network devices 630, such as computing device 630, via physical or wireless links to a network interface 625. In some implementations, the network interface controller 620 implements a network protocol such as LTE, TCP/IP Ethernet, IEEE 802.11, IEEE 802.16, Bluetooth, or the like.

The other computing devices 630 are connected to the computing device 610 via a network interface port 625. The other computing device 630 can be a peer computing device, a network device, a server, or any other computing device with network functionality. In some embodiments, the computing device 630 can be a network device such as a hub, a bridge, a switch, or a router, connecting the computing device 610 to a data network such as the Internet.

In some uses, the I/O interface 640 supports an input device and/or an output device (not shown). In some uses, the input device and the output device are integrated into the same hardware, e.g., as in a touch screen. In some uses, such as in a server context, there is no I/O interface 540 or the I/O interface 640 is not used. In some uses, additional other components 680 are in communication with the computer system 610, e.g., external devices connected via a universal serial bus (USB).

The other devices 680 can include an I/O interface 640, external serial device ports, and any additional co-processors. For example, a computing system 610 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 610, e.g., a touch screen on a tablet device. In some implementations, a computing device 610 includes an additional device 680 such as a co-processor, e.g., a math co-processor that can assist the processor 650 with high precision or complex calculations.

Exemplary technical effects of the methods, systems, apparatuses, and non-transitory machine readable storage mediums described herein include, by way of non-limiting example, reduced operational costs and a reduced need for complex specialized network equipment or network deployments. The exemplary embodiments of the single integration layer described herein can provide for improved reliability of digital worker platforms as the use of a single integration layer can result in a reduced number of failure points (and therefore, a reduced likelihood of downtime and/or service outages). By using the single integration layer described herein, increased control and optimization of the operations of the digital worker platform can be realized. In addition, some implementations of the subject matter described herein can provide for scalability of computational resources that is closely tied to the demand for those resources, thereby resulting in the more efficient use of the computational resources.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
   receiving, at a first layer of a hierarchical structure, task data characterizing a request to perform a task, the task data received from one of a digital worker that simulates actions and interactions of autonomous agents,
   wherein the hierarchical structure comprises:
      the first layer;
      a digital worker application layer having a collection of applications;
      a integration interface layer having a collection of application programming interfaces; and
      an infrastructure as a service layer communicating with a remote computing environment;
   based on receiving the task data characterizing the request to perform a task, processing by the digital worker application layer, the received task data, wherein processing the received task data comprises:
      interpreting the received task data;
      determining a subset of applications of the collection of applications to process the received task data;
      for each application of the determined subset of applications, determining at least one of transformed task data, routed task data and/or converted task data from the received task data;
      instantiating a plurality of state machines associated with each application of the determined subset of applications, based on at least one of the received task data, the transformed task data, the routed task data, and/or the converted task data;
      processing the received task data, the transformed task data, the routed task data, and/or the converted task data at the respective plurality of state machines, wherein processing by the state machine includes making, by the plurality of state machines, application programming interface calls to the integration interface layer for handling state machine operations; and
   based on the application programming interface calls, executing, by the infrastructure as a service layer, performance of the calls to the remote computing environment, wherein the first layer causes the remote computing environment to perform an operation for the digital worker, based on the received task data, such that the task is performed.

2. The method of claim 1, wherein the one of the collection of applications is configured to execute an end-to-end process that includes the task.

3. The method of claim 1, wherein the instantiating of the plurality of state machines includes:
   instantiating a first state machine of the plurality of state machines, the first state machine configured to determine, from the received task data, subtask data characterizing instructions for performing at least a portion of the task; and
   instantiating a second state machine of the plurality of state machines, the second state machine configured to determine resource data characterizing a computational resource of the remote computing environment required to perform the subtask.

4. The method of claim 3, wherein the second state machine monitors for an event characterizing an operation performed by the first state machine, and wherein, in response to detection of the event, performs a state transition.

5. The method of claim 1, further comprising:
   receiving, by the first layer and via the application programming interface, output data characterizing a result of the performed task; and
   providing the output data to the one of the collection of applications.

6. The method of claim 5, further comprising:
   providing, by the one of the collection of applications, the output data to a graphical user interface for depiction therein.

7. The method of claim 1, wherein the task includes at least one of optical character recognition, automated machine learning, Rivest-Shamir-Adleman ("RSA") encryption, business process management, data storage, human-in-the-loop ("HIL") simulation, scheduling, monitoring, alerting, and security and password vault processes.

8. The method of claim 1, wherein the remote computing environment includes a feature layer configured to perform the task and an infrastructure as a service layer that is configured to provide a computational resource for performing the task.

9. The method of claim 1, wherein the task data is received from a digital worker state machine that forms the digital worker.

10. The method of claim 1, wherein the first layer is configured to determine one or more location-independent mechanisms, provide dynamic service substitution and/or virtualization, regulate messaging and interaction protocols, indicate computational resources of the remote computing environment, transform messages, handle exceptions, enforce access and security privileges, maintain a history of task performance requests, and/or track a status of task performance requests.

11. A system comprising:
   at least one data processor; and
   memory storing instructions configured to cause the at least one data processor to perform operations comprising:
      receiving, at a first layer of a hierarchical structure, task data characterizing a request to perform a task, the task data received from one of a digital worker that simulates actions and interactions of autonomous agents;
      wherein the hierarchical structure comprises:
         the first layer;
         a digital worker application layer having a collection of applications;
         an integration interface layer having a collection of application programming interfaces; and
         an infrastructure as a service layer communicating with a remote computing environment;
      based on receiving the task data characterizing the request to perform a task, processing by the digital worker application layer, the received task data, wherein processing the received task data comprises:
         interpreting the received task data;
         determining a subset of application of the collection of applications to process the received task data;
         for each application in the determined subset of applications, determining, by the first layer, at least one of transformed task data, routed task data, and/or converted task data from the received task data;

instantiating a plurality of state machines associated with each application of the determined subset of applications, based on at least one of the received task data, the transformed task data, the routed task data, and/or the converted task data; and processing the received task data, the transformed task data, the routed task data, and/or the converted task data at the respective plurality of state machines, wherein processing by the state machine includes making, by the plurality of state machines, application programming interface calls to the integration interface layer for handling state machine operations; and based on the application programming interface calls, executing, by the infrastructure as a service layer, first layer, performance of the calls to the remote computing environment, wherein the first layer causes the remote computing environment to perform an operation for the digital worker, based on the received task data, such that the task is performed.

12. The system of claim 11, wherein the one of the collection of applications is configured to execute an end-to-end process that includes the task.

13. The system of claim 12, wherein the second state machine monitors for an event characterizing an operation performed by the first state machine, and wherein, in response to detection of the event, performs a state transition.

14. The system of claim 11, wherein the instantiating of the plurality of state machines includes:

instantiating a first state machine of the plurality of state machines, the first state machine configured to determine, from the received task data, subtask data characterizing instructions for performing at least a portion of the task;

instantiating a second state machine of the plurality of state machines, the second state machine configured to determine resource data characterizing a computational resource of the remote computing environment required to perform the subtask.

15. The system of claim 11, wherein the operations further comprise:

receiving, by the first layer and via the application programming interface, output data characterizing the performed task; and providing the output data to the one of the collection of applications.

16. The system of claim 15, wherein the operations further comprise: providing, by the one of the collection of applications, the output data to a graphical user interface for depiction therein.

17. The system of claim 11, wherein the task includes at least one of optical character recognition, automated machine learning, Rivest-Shamir-Adleman ("RSA") encryption, business process management, data storage, human-in-the-loop ("HIL") simulation, scheduling, monitoring, alerting, and security and password vault processes.

18. The system of claim 11, wherein the remote computing environment includes a feature layer configured to perform the task and an infrastructure as a service layer that is configured to provide a computational resource for performing the task.

19. The system of claim 11, wherein the first layer is configured to determine one or more location-independent mechanisms, provide dynamic service substitution and/or virtualization, regulate messaging and interaction protocols, indicate computational resources of the remote computing environment, transform messages, handle exceptions, enforce access and security privileges, maintain a history of task performance requests, and/or track a status of task performance requests.

20. A non-transitory computer program product storing instructions which, when executed by at least one data processor forming part of at least one computing system, cause the at least one data processor to implement operations comprising:

receiving, at a first layer of a hierarchical structure, task data characterizing a request to perform a task, the task data received from one of a digital worker that simulates actions and interactions of autonomous agents;

wherein the hierarchical structure comprises:
the first layer;
a digital worker application layer having a collection of applications;
a integration interface layer having a collection of application programming interfaces; and
an infrastructure as a service layer communicating with a remote computing environment;

based on receiving the task data characterizing the request to perform a task, processing by the digital worker application layer, the received task data, wherein processing the received task data comprises:
interpreting the received task data;
determining a subset of applications of the collection of applications to process the received task data;
for each application of the determined subset of applications, determining at least one of transformed task data, routed task data and/or converted task data from the received task data;
instantiating a plurality of state machines associated with each application of the determined subset of applications, based on at least one of the received task data, the transformed task data, the routed task data and/or the converted task data;
processing the received task data, the transformed task data, the routed task data, and/or the converted task data at the respective plurality of state machines, wherein processing by the state machine includes making, by the plurality of state machines, application programming interface calls to the integration interface layer for handling state machine operations; and
based on the application programming interface calls, executing, by the infrastructure as a service layer, performance of the calls to the remote computing environment, wherein the first layer causes the remote computing environment to perform an operation for the digital worker, based on the received task data, such that the task is performed.

* * * * *